United States Patent
Prasad et al.

(10) Patent No.: US 10,153,003 B2
(45) Date of Patent: Dec. 11, 2018

(54) METHOD, SYSTEM, AND APPARATUS FOR GENERATING VIDEO CONTENT

(71) Applicant: The Aleph Group Pte., Ltd., The Central (SG)

(72) Inventors: Venkateswaran Prasad, Dublin, CA (US); Sameer Pitalwalla, Mumbai (IN); Rohit Marathe, Pune (IN); Chinmay Gangakhedkar, Pune (IN); Chetan Chopda, Nashik (IN); Manish Gurnaney, Pune (IN); Pankaj Mendki, Pune (IN); Hemant Sachdeva, Pune (IN); Vikram Fugro, Pune (IN); Bharat Swaminathan, Pune (IN); Pawan Kanodia, Pune (IN)

(73) Assignee: The Aleph Group Pte, Ltd, The Central (SG)

( * ) Notice: Subject to any disclaimer, the term of this patent is extended or adjusted under 35 U.S.C. 154(b) by 0 days.

(21) Appl. No.: 15/261,933

(22) Filed: Sep. 10, 2016

(65) Prior Publication Data

US 2018/0075879 A1   Mar. 15, 2018

Related U.S. Application Data

(60) Provisional application No. 62/217,865, filed on Sep. 12, 2015, provisional application No. 62/217,863, filed on Sep. 12, 2015.

(51) Int. Cl.
*H04N 5/93* (2006.01)
*G11B 27/00* (2006.01)
*G11B 27/036* (2006.01)
*H04N 5/272* (2006.01)
*H04N 5/265* (2006.01)
*H04N 9/80* (2006.01)

(52) U.S. Cl.
CPC .......... *G11B 27/036* (2013.01); *H04N 5/265* (2013.01); *H04N 5/272* (2013.01)

(58) Field of Classification Search
USPC .................................................. 386/280, 248
See application file for complete search history.

(56) References Cited

U.S. PATENT DOCUMENTS

| | | | | |
|---|---|---|---|---|
| 8,244,103 B1* | 8/2012 | Shore | ..................... | G11B 27/34 386/278 |
| 2010/0010884 A1* | 1/2010 | Cohee | ..................... | G06Q 30/02 705/14.12 |
| 2010/0183280 A1* | 7/2010 | Beauregard | .......... | G11B 27/034 386/285 |
| 2015/0194185 A1* | 7/2015 | Eronen | .................. | H04N 13/02 386/279 |
| 2015/0217196 A1* | 8/2015 | McCarthy | ............. | A63F 13/497 463/24 |
| 2017/0270970 A1* | 9/2017 | Ho | ........................ | G11B 27/036 |

* cited by examiner

*Primary Examiner* — Nigar Chowdhury
(74) *Attorney, Agent, or Firm* — Noli IP Solutions PC

(57) ABSTRACT

The present inventive subject matter is drawn to method, system, and apparatus for generating video content related to an audio media asset. In one aspect of this invention, a method for generating video content based on the audio media asset stored in a computer memory is presented, where at least one image and one video effect are applied to generate a plurality of video frames, and the plurality of video frames are combined with the audio media asset to produce video content.

13 Claims, 5 Drawing Sheets

# METHOD, SYSTEM, AND APPARATUS FOR GENERATING VIDEO CONTENT

The present application claims priority to U.S. provisional patent applications No. 62/217,863, and provisional patent application No. 62/217,865, both filed on Sep. 12, 2015, the content of each of which is included herein by reference. The present disclosure of the invention substantially shares its content with pending applications (application Numbers to be inserted by amendment once determined), the content of each of which is hereby included by reference.

These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The present invention relates, in general, to methods and systems for generating video content. Specifically, this invention provides for using an audio input and other properties characterizing the audio input, collected from a network of distributed data sources, elaborating a contextual framework for the audio input, searching for visual content within the contextual framework, and composing video content.

BACKGROUND

The following description includes information that may be useful in understanding the present invention. It is not an admission that any of the information provided herein is prior art or relevant to the presently claimed invention, or that any publication specifically or implicitly referenced is prior art.

Visual displays (Video/Image) are often used to accompany audio content, even when audio track is the main carrier of the relevant content (e.g., music, radio broadcast, etc.). Existing production of visual content relies on the creativity of the persons who use their own experience, knowledge in the typical field of art (e.g., music) to compose the elements of a video. The creator user must also be knowledgeable in any given project about the target audience for which the video content is composed. The latter is time consuming and relies on a vast expertise on the part of the creator user.

There are several types of assets that are involved in the process of generating video content. For example, images, audio, digital drawings, textual content, etc. Selecting appropriate type of media assets while generating video content is a time consuming process. Considerable effort would be required to analyze media assets and to determine the correct combination to generate the video content, if this process is manually performed. The asset suitability may depend on various factors, including the context of the audio track, history of the available relevant video assets, and/or popularity of videos in the genre.

Software applications, such Adobe AfterEffects or Apple's iMovie and others, allow for a user to create videos by being able to combine various footages and images. However, the aforementioned applications limit the user to clippings or images the user's own. Additionally, these types of applications provide limited video customization capabilities, with little to no insights in terms of the betterment of the target video content. There are also efficiency and scalability issues manifested by these applications in compose a video. Integration with social platforms, such as YouTube or Facebook, are also lacking, in some if not all of these applications.

Thus, there is a need for a software system that enables users to create personalized video content for audiences' taste and at scale, and to allow the user to create, within a short period of time, different video variations for the same audio track.

Giving the power to a user to generate custom video contents is at the core of this invention. This invention provides the tools by which a creator user input is processed to generate meaningful recommendations, for the purposes of helping the creator user generate new media content. The goal is that the new media content made for a target audience is of high quality and captures the interest of that target audience.

More specifically, this invention provides for allowing the user to create different video variations that may be based on the user's input. Additionally, the user is empowered with the option to choose from recommended assets to include in the process of generating the user's own customized video content. Thus, the generated video content is personalized to the user's and/or other viewers' taste, and at scale.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The present inventive subject matter is drawn to method, system, and apparatus for generating video content related to a first audio media asset. In one aspect of this invention, a method for generating video content based on the first audio media asset stored in a computer memory is presented.

In some embodiments, the method for video content based on the first audio media asset may be configured to automatically providing access to the computer memory, where the computer memory may be configured to store a plurality of media assets, and providing access to a network, such that the computer memory is connected to the network.

In some embodiments, the method may further comprise the steps of identifying at least one image and at least one video effect, determining an effect time duration to apply the video effect, and applying the video effect to the image. The method may also comprise the step of generating a first video frame using the applied video effect to the image. In some embodiments, the method may comprise the step of generating a plurality of effect video frames based on the first video frame. The method may also comprise the steps of arranging the first video frame and the plurality of effect video frames to form a video media asset, and combining the audio media asset with the video track to produce the final video content. In some embodiments, the first video frame and the effect video frames may have an effect video frames number.

In some preferred embodiments, the method for generating video content may further comprise the steps of: determining whether the effect video frames are overlaid; if the effect video frames are overlaid, determining an overlay time duration; extracting a plurality of overlay video frames from the overlay video frames, and the plurality of overlay video frames have an overlay video frames number; determining whether the overlay video frames number is less than the effect video frames number; if the overlay video frames number is less than the effect video frames number, superimposing the overlay video frames over the effect video frames; if the overlay video frames number is not less than the effect video frames number, superimposing the effect video frames number of the overlay video frames over the effect video frames; and superimposing the overlay video frames number minus the effect video frames number of the overlay video frames over the effect video frames.

In some embodiments, the effect video frames number may be equals to a Frames Per Second (FPS) of the video media asset multiplied by the effect time duration. In some other embodiments, the overlay video frames number may be equals to an FPS of the overlay video frames multiplied by the overlay time duration.

In some other preferred embodiments, the method for generating video content may also comprise the steps of: identifying a second image; selecting a transition effect to be applied between the image and the second image; applying the transition effect to a transition effect video frame; and generating a transition effect video frame for transitioning from the image to the second image based on the transition effect video frame.

In yet other preferred embodiments, the method for generating video content may comprise the steps of: determining whether the transition effect video frame is overlaid; if the transition effect video frame is overlaid, superimposing one overlay video frame on top of the transition effect video frame; and including the transition effect video frame in the corresponding order to be combined with the video content.

In some embodiments, the audio media asset may be stored in a second computer memory. The second computer memory may be accessible over the network, in some embodiments, or over an external network, in other embodiments. The first audio media asset may be stored in an external computer memory, in some other embodiments.

In another aspect of the invention, a non-transitory computer-readable medium for generating video content based on an audio media asset, may include instructions stored thereon, that when executed on a processor, may perform the steps including: identifying at least one image and at least one video effect; determining an effect time duration to apply the video effect; applying the video effect to the image; generating a first video frame using the applied video effect to the image; generating a plurality of effect video frames based on the first video frame; arranging the first video frame and the plurality of effect video frames to form a video media asset; and combining the audio media asset with the video track to produce the final video content.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
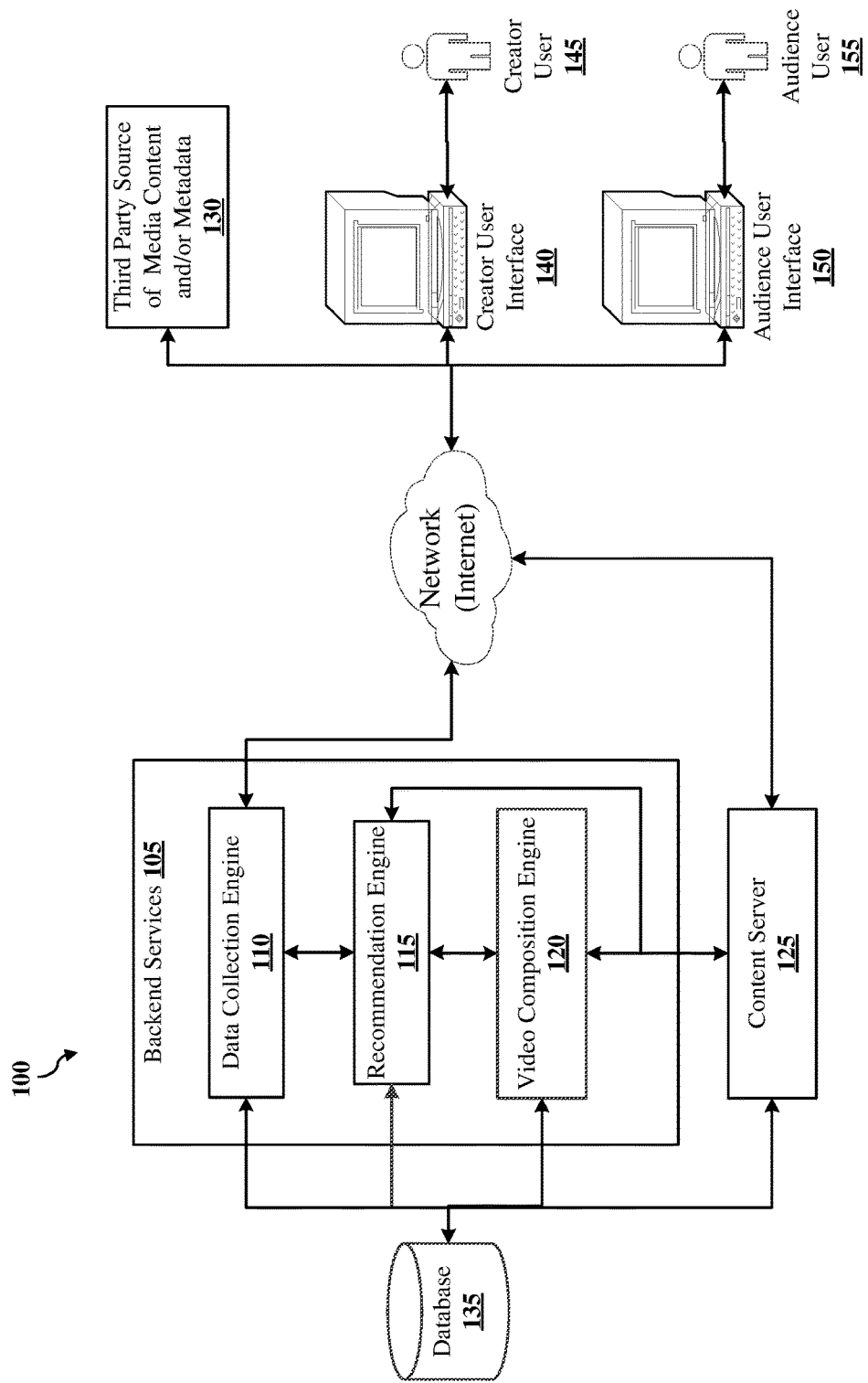
FIG. 1 shows an example computing environment representing a system for generating video content in accordance with one embodiment of this invention.

Giving the power to a user to generate custom video contents is at the core of this invention. This invention provides the tools by which a creator user input is processed to generate meaningful recommendations, for the purposes of helping the creator user generate new media content. The goal is that the new media content made for a target audience is of high quality and captures the interest of that target audience.

More specifically, this invention provides for allowing the user to create different video variations that may be based on the user's input. Additionally, the user is empowered with the option to choose from recommended assets to include in the process of generating the user's own customized video content. Thus, the generated video content is personalized to the user's and/or other viewers' taste, and at scale.

The following detailed description is shared and refers to co-pending patent application (number: to be determined), entitled: Method and System for Collecting and Processing Digital Media Audience Data, which is hereby incorporated by reference in its entirety.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Terminology

Unless otherwise specifically defined, terms, phrases and abbreviations used in this disclosure are commonly known in the art of information technology and computer programming and may be in use in one or more computer programming languages and the definition of which is available in computer programming dictionaries. However, the use of the later terms, phrases and abbreviation in the disclosure is meant as an illustration of the use of the concept of the invention and encompasses all available computer programming languages provided that the terms, phrases and abbreviations refer to the proper computer programming instruction(s) that cause a computer to implement the invention as disclosed. Prior art publications that define the terms, phrases and abbreviations are included herein by reference.

In the following, a systems according to the invention, unless otherwise specifically indicated, comprise a client machine and/or server machine and any necessary link, such as an electronic network. A client machine comprises such devices as personal computers (e.g., a laptop or desktop etc.), hardware servers, virtual machines, personal digital assistants, portable telephones, tablets, or any other device. The client machines and servers provide the necessary means for accessing, processing, storing, transferring or otherwise carrying out any type of data manipulation and/or communication.

The methods of the invention enable the system, depending on the implementation, to remotely or locally query, access and/or upload data from/onto a network resource. For example, accessing a World Wide Web (WWW) location over the Internet as the network.

A machine in the system (e.g., client and/or server machine) refers to any computing machine enabling a user or a program process to access a network and execute one or more steps of the invention as disclosed. For example, a machine may be a User Terminal such as a stand alone machine or a personal computer running an operating system such as, MAC-OS, WINDOWS, UNIX, LINUX, or any other available operating systems. A machine may be a portable computing device, such as a smart phone or tablet, running a mobile operating system such as iOS, Android or any other available operating system. A Host Machine may be a server, control terminal, network traffic device, router, hub, or any other device that may be able to access data, whether stored on disk and/or memory, or simply transiting through a network device. A machine is typically equipped with hardware and program applications for enabling the device to access one or more networks (e.g., wired or wireless networks), storage means for storing data (e.g., computer memory) and communicating means for receiving and transmitting data to other devices. A machine may be a virtual machine running on top of another system, e.g., on a standalone system or otherwise in a distributed computing environment, to which it is commonly referred as cloud computing.

A "user" as used in this disclosure refers to any person using a computing device, or any process (e.g., a server and/or a client process) that may be acting on behalf of a person or entity to process and/or serve data and/or query other devices for specific information. In specific instances, an "audience user" may refer to a user accessing digital media, for simply viewing the content of the media and/or interacting with the media.

In other instances, the disclosure refers to a "creator user" as being a user who utilizes the output of the system according to the invention (e.g., feedback information such as viewership statistics) to create new digital media. A "creator user" is enabled to carry out any type of data manipulation, such as filming new videos, altering existing videos or audio data or any other manipulation of digital media.

In the following disclosure, a Uniform Resource Locator (URL) refers to the information required to locate a resource accessible through a network. On the Internet, the URL of a resource located on the World Wide Web usually contains the access protocol, such as HyperText Transfer Protocol (HTTP), an Internet domain name for locating the server that hosts the resource, and optionally the path to a resource (e.g., a data file, a script file, and image or any other type data) residing on that server.

An ensemble of resources residing on a particular domain, and any affiliated domains or sub-domains, are typically referred as a WWW site, or "website" in short. For example, data documents, stylesheets, images, scripts, fonts, or other files are referred to as resources.

Resources of a website are typically remotely accessed through an application called "Browser". The browser application is capable of retrieving a plurality of data type from one or more resource locations, and carrying out all the necessary processing to present the data to the user and allow the user to interact with the data.

A Browser may automatically conduct transactions on behalf of the user without specific input from the user. For example, the browser may retrieve and upload uniquely identifying data (commonly referred as "cookies"), from and to websites.

Typically, an operator of (or process executed on) a machine may access a website, for example, by clicking on a hyperlink to the website. The user may then navigate through the website to find a web page of interest. Public information, personal information, confidential information, and/or advertisements may be presented or displayed via a browser window in the machine or by other means known in the art (e.g., pictures, video clips, etc.).

In the following disclosure, communication means (e.g., websites) specialized in providing tools for users to communicate with one another, or a user with a group of other users, share data or simply access a stream of digital data, are typically referred as social media.

While describing video content in the following, "content format" may be used to refer to the category of the topic covered in a video. For example, a video may be a guide to use a machine, in which case, the video can be categorized in the "how-to" category. Similarly, other topic categories may be "review", "parody", "unboxing", "advertisement" or any other topic category. "Content format" may also be used to refer to the content treatment, such as the theme, structure, effects, etc that may compose the video content.

FIG. 1 shows an example computing environment 100 representing a system for generating video content in accordance with one embodiment of this invention. Each block in FIG. 1 represent sets of system (software and hardware) components that when executed achieve the functional results as described below. The several components may be localized in a single machine or distributed across multiple machines, sites and/or platforms. Any of the machines may remotely communicate over a network (e.g. the Internet).

FIG. 1 illustrates that the system may include a backend services components 105, which may be connected to creator users 145 and/or audience users 155 directly or over a network. In some preferred embodiments, users may utilize user interfaces to interact with the system. For example, in some of these embodiments, a creator user 145 may use a creator user interface 140, and an audience user 155 may use an audience user interface 150 to interact and interface with the system's backend services 105. In some embodiments, the backend services 105 components may be able to communicate with a third party source 130. The third party source may comprise an external non-transitory computer readable medium (for example a computer storage, a computer hard drive, computer disk, or a database) that stores media assets, media related information, and/or metadata. The third party source may be accessible through an internal network or an external network (for example, the internet), in some of the preferred embodiments. In other embodiments, the system may include a database 135 that may store local configuration, media data, and any other type of data necessary to service the video generation processes. In these embodiments, the database 135 may be connected to the backend services 105. The database 135 may also be connected to the data collection engine 110, in some embodiment, the recommendation engine 115, in other embodiments, and/or the video composition engine 120, in yet other embodiments.

In some embodiments, the backend services 105 may be able to communicate with a content server 125, which may be utilized to store and/or process media data (For example, video, audio, metadata, etc.).

In some embodiments, the backend services 105 may include a data collection engine 110 comprising software system components that may collect data and/or organize the data in order to facilitate further processing. The data collection engine 110 may obtain data about a set of media assets from external sources, such as the World Wide Web (the Internet). The media assets may include, for example, a video clip and its metadata listed in some Facebook pages, which needs to be retrieved, or a list of video assets specifically identified, whose statistics needs to be fetched from YouTube, or any other textual data of which relevant information needs to be retrieved from the Internet. For example, the audience user data may be collected in real-time as the viewers retrieve the media content, and as they input comments, discussion, simultaneously or successively visit other media content or carry out any other behavior that may be associated with the attributes or access of a particular media content.

The data collection engine 110 may also retrieve data from third party providers. The latter may be one or more repositories that contain information about any particular media stream, audience data or any other type of data that may be pertinent for the data collection and processing as provided by implementations of the invention.

A system according to the invention comprises a set of (software and hardware) components that enable the system to process the collected data and build a back-end resource to allow the system make recommendations to a creator user to generate new video content.

A system according to the invention may comprise a video composition engine 120, which is a set of (software and hardware) components that enable a user to produce digital content. In some embodiments, the video composition engine 120 may operate in conjunction with a recommendation engine 115, which functions to scan media assets data collected by the data collection engine 110, and according to the functions of this invention, come up with a set of recommended images, features, footages, etc, which then may be used by the video composition engine 120 to generate the user's customized video content. A creator user, for example, is able to use the system to learn about the content a target audience is watching, what different kind of content is appealing to the various audience fragments or any other information that may lead a creator user in generating content of interest to any given audience.

This invention provides for method steps, which may be implemented in a system, as an Extensible Multithreaded Data Gathering Framework that aims to address several challenges that arise when gathering large amounts of data, such as when collecting a list of brand names whose communication sources (e.g., Facebook page) needs to be retrieved, or a list of videos whose statistics needs to be fetched from one or more repositories on the Internet (e.g., YouTube), or any other textual data whose relevant information needs to be retrieved from the Internet. An embodiment of the invention may implement the extensible multi-threaded data gathering framework by means of a plugin-based extensible architecture delegating the site-specific responsibility to the plugin while at the core providing a fault-tolerant multi-threaded service on which the plugins are run to gather the data from the web.

Figure 2:
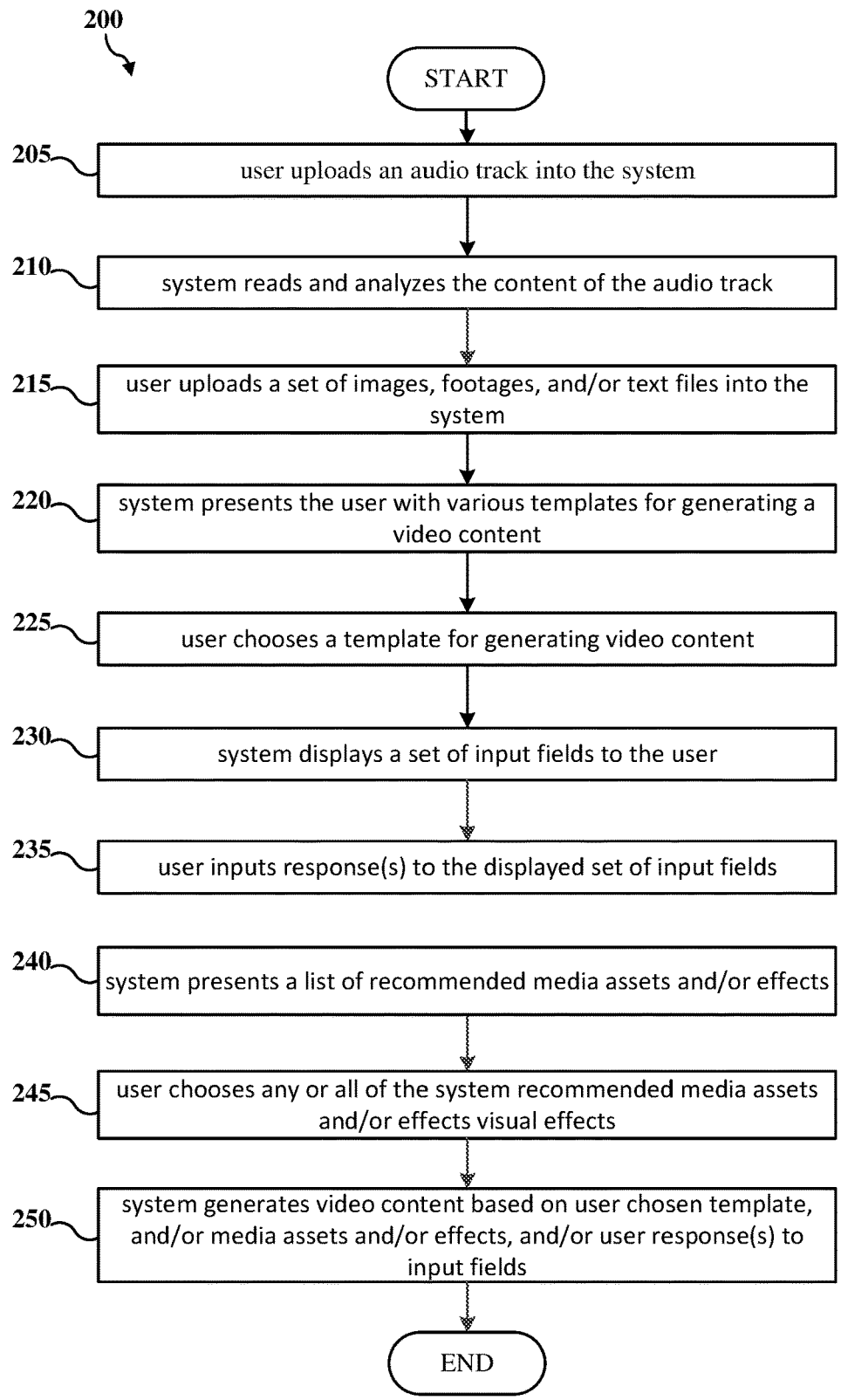
FIG. 2 shows a flow chart describing the overarching method for generating video content according to a preferred embodiment of the present invention.

FIG. 2 shows a flow chart describing the overarching method for generating video content 200, according to a preferred embodiment of the present invention. In step 205, a user may use a Graphical User Interface (GUI) to upload an audio track into the system's repository. In some embodiments, the user may be able to upload more than one audio track into the system, where each audio track may be processed in the same manner by the system. The audio track may be used by the system to provide an audio component of the video content to be generated. In step 210, the system may read and analyze the content of the audio track. In some preferred embodiments, the system may comprise an ingestion module (For example, the data collection engine 110), which may be utilized to import the audio track's catalogues, metadata, and other relevant information about the audio track.

In step 215, the user may use the system to upload a set of images, footages, and/or text files, to be used in conjunction with generating the video content, which corresponds to the uploaded audio track. In some preferred embodiments, the ingestion module may also be used to import and upload the user's set of images, footages, and/or text files. In other embodiments, the system may also comprise a library module, which may manage these user uploaded assets, and may provide means of searching and tagging these assets. In these embodiments, the library module may also be used to manage other internal and/or external media assets, which may also be used in conjunction with generating the video content.

In step 220, the user may be presented with various templates that may be used by the system to generate the video content corresponding to the uploaded audio track. Each template may comprise a number of attributes relevant to creating the new video content. Examples of such attributes may include special effects for displaying text, a set of images that are relevant to the context of the analyzed audio track and their corresponding display characteristics, etc.

Illustrative template examples may include Lyrical Videos templates, such as Kinetic typo, Lyric Text drop down, Video Book, Oscillating Lyric lines, and Lyric lines moving in circle. Other examples may include Static Animation templates, such as Record Player, Boom box, Videos/Footages playing in TV. Also template examples may include Rich Footage, such as Kaleidoscope, Video overlays playing on top of each other, Split screen, Footage playing in blinking eye, Coverarts, Devotional, etc.

In some preferred embodiments, the Video Book template may apply to an audio track containing audio book recordings. An audio book is a recording of a reading of a book, typically a novel. The experience of listening to an audio book is greatly enhanced by converting the same to a video by adding context appropriate video content. A video book is created by converting an audio book to video format. The video may have a number of visual and textual special effects. The video may also include a set of a system selected images. The system selected images may be relevant to the context of the audio book and may also be preprogrammed to be timely presented to a viewer based on the content of the audio book. In some preferred embodiments, the video book template may comprise video format storyboards and/or themes that are designed for the audio book under consideration.

In some preferred embodiments, the system may comprise a cover-arts service. The cover-arts service may be a software based service that generates video content based on an audio track by means of stitching various images and video frames. The basic concept is to have a video that may include images displayed in a sequence separated by transitional visual effects. This process may be scaled to generate a large volume of videos by defining a configuration at the input. The changeover from one image to another may be accompanied by any one of several transition methods such as image blurring, etc. Other effects, such as zoom in, zoom out may be applied to individual images and various types of video frames may be overlaid on top of the video to provide different forms of special effects.

In step 225, the user may choose one of the system provided templates. The system may then use the attributes of the chosen template to generate the video. In step 230, the system may display a set of desired input to the user. The set of desired input displayed to the user may be generated in response to the user selected template. In step 235, the user may also input responses to the system's prompts of step 6. In some embodiments, an image recommendation service may manage capturing and processing the user's responses to produce a set of recommendations to the user, in relation to generating the final video content. The system recommendations may include set of images, visual effects, video frames, etc to be used in generating the final video content.

In step 240, the system may provide the user with recommendations as to set of images, footages, text, textual/graphical visual effects, video frames, etc to be used in generating the video content. The system may make these recommendations in response to the user selected template in some embodiments. In other embodiments, the system may make its recommendations based on the system's analysis of the uploaded audio track. In yet other embodiments, the system may generate such recommendations based on a combination of the user selected template and/or the system's analysis of the uploaded audio track. In some embodiments, the system may comprise an image recommendation service, which may perform the processing of the user's input, the analysis of the uploaded audio track and/or its metadata, for the purposes of generating a set of recommendations as to the set of images to be used in generating the video content.

In step 245, the user may choose any or all of the recommended images, footages, text, textual/graphical visual effects, video frames, etc to be combined with the audio track to produce the video content, according to some embodiments. In other embodiments, the user may choose system recommended images, footages, text, textual/graphical visual effects, video frames, etc, and may also choose a set that may include images, footages, text, textual/graphical visual effects, video frames, etc that are not system recommended. In yet other embodiments, the system may utilize a combination of user chosen images, footages, text, textual/graphical visual effects, video frames, etc, alongside a user chosen template as input to the process of generating the video content.

In some preferred embodiments, the system may comprise a video editing user interface (UI). The video editing UI may be software based graphical user interface (GUI), where the user may manage and arrange various media assets as desired by the user. The user may also control playback time for each of the chosen media assets or any of their component. The user's editing of the media assets may then be used in the process of generating the final video content.

In step 250, the system may generate the video content based on the user's chosen template and/or set of images. In some preferred embodiments, the system may comprise a kinetic typography service. Kinetic typography is the technique of mixing motion and text to express concepts, ideas, messages, etc, using video animation.

Figure 3:
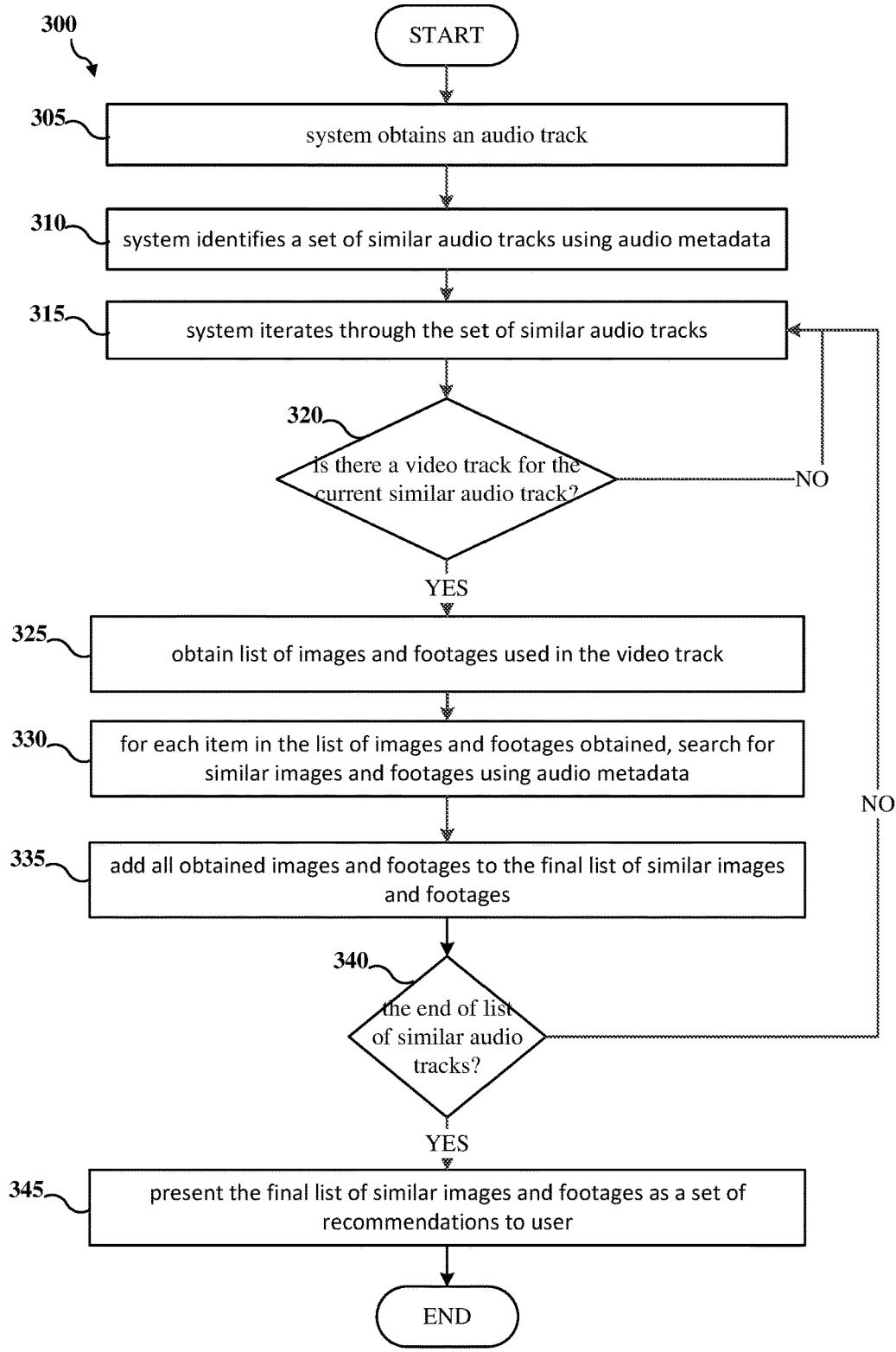
FIG. 3 shows a method of operation of the recommendation engine according to one preferred embodiment as provided by this invention.

In other embodiments, the system may comprise the recommendation engine 115. FIG. 3 300 shows a method of operation of the recommendation engine according to one preferred embodiment as provided by this invention. The recommendation engine may be used to provide suggestions to formulate the set of recommended images that are relevant to the content of the audio track. The recommendation engine may be a software based service that may be running on one or more computer hardware systems. The recommendation engine may analyze metadata of an audio track, and may provide recommendations for media assets and/or effects that the system may use to generate video contents. Metadata of the audio track may include data such as the Artist, Album and/or Genre information, etc which can be utilized to find other similar audio tracks, which may have been already converted or may already have a corresponding video content. A performance metric may also be applied on any located videos to arrive at relevant image recommendations. This recommendation engine helps augment the video generation process by giving alternate suggestions to the user of the system.

In step 305 of the method illustrated in FIG. 3, the system may obtain an audio track as an input. In step 310, the system may identify a set of "similar" audio tracks to the obtained audio track. In some embodiments, the metadata of the audio tracks may be utilized to make the similarity determination.

The audio metadata input may be in the form of a JSON document; key-value pairs, referred to as a feature set. The input metadata may then be enriched by fetching a list of tags for the given set (For example, track name, artist name, etc.) from various media information sources (For example, Wikipedia, Youtube, Google, etc). These tags may then be stored as entities for a given metadata feature set.

In these embodiments, similar audio metadata documents may then be identified based on the input feature set and its corresponding entities. Similar audio metadata document may be identified from within the system or from other external systems or sources of media assets. A cosine similarity σ function may be applied to measure the similarity of two vectors, one vector belonging to the obtained audio track, and the second belonging to another audio track.

In step 315, the system iterates through the list of similar audio tracks by identifying the next audio track to be compared. In step 320, for each audio track in the list of similar audio tracks, a determination is made as to whether the current audio track has a corresponding video track. If the current audio track does not have a corresponding video track, the system moves on to process the next audio track on the list of similar audio tracks. If the current audio track has a corresponding video track the process proceeds.

In step 325, a list of images and footages used in the audio track's corresponding video track are obtained. The current audio track's metadata may be used to identify the list of images and footages in some embodiments. In step 330, a search may be conducted of the internal system and/or external sources of media assets to allocate similar images, footages, etc to those obtained from the video track corresponding to the current audio track. The audio metadata may be utilized to determine and allocate these similar images, footages, etc.

In step 335, the allocated similar images, footages, etc may be added to a final list of recommendations. In step 340, if there remains any in the list of similar audio tracks that has not been processed, repeat steps 320 through 335 as illustrated in FIG. 3, otherwise, move on to step 345 to present the final list of similar images, footages, etc to the user as the list of system recommendations.

In some embodiments, a Weight function ω, a Similarity function σ, and a Term-image scores function ψ may be employed to identify the set of candidate images according the method illustrated in FIG. 3. For example, in some preferred embodiments, the recommendation engine may classify the audio metadata as documents. The term "document" or "D" in the following sections, refer to the collection of words in the entire metadata of an audio media asset. The recommendation engine may then use a cosine similarity function to identify a set of similar documents to D within the system's ecosystem or from external sources. The recommendation engine may use a term-image scoring mechanism which assigns a score to each image used in the system generated video content. This creates a correlation between the metadata of an audio track and images used within the videos generated from the same audio. This correlation may allow the recommendation engine to successfully identify images from past history and derive relevant recommendations.

The recommendation engine may identify contextual information within videos and images and use rich sources of data such as Wikipedia, social platforms, etc to gather and enrich the existing metadata for audio/video tracks. The recommendation engine may be able to detect songs from sample audio pattern and tunes to identify album, track information, suggest images, footages, textual data, etc to be used for video content generation.

In one of such preferred embodiments, the recommendation engine may take the following as input: (1) The document $D_i$ (audio metadata) of the input audio file that needs to be mapped to appropriate images; (2) The existing m mapped documents and for each of the m documents, their corresponding term-image scores; and (3) A keyword-searchable source of images that would fetch relevant images from an external source. In these embodiments, the recommendation engine may provide the following output post processing the above input: (1) $P_{D_i}$—the set of pairs of important terms and relevant images; and (2) $\psi_{P_{D_i}}(a, b) \forall (a, b) \in P_{D_i}$ – the score of each such pair.

The following is an example algorithm of such preferred embodiment, where:
$\subseteq$ notation for subset or belongs
$\in$ notation for element of
$\mathbb{R}^+$ notation for real numbers in the positive domain
ω notation for weight ∩ notation for intersection σ mathematical symbolic representation of the similarity function ψ notation for term Image score function.

| notation for given that (mathematical representation in set notations)

∧ notation for logical and $\vec{S}_a$ and $\vec{S}_b$ two sequences (score vectors)

$I_D$ set of images $i_i$ through $i_l$ (i.e. $\{i_1, i_2, \ldots, i_l\}$)

∀ notation for all values of

In this context, let $D=\{w_1, w_2, \ldots, w_n\}$ be the document of words in the metadata of the audio track under consideration. Let F be the feature set containing only the important terms in the document D, where $F \subseteq D$. Let m denote the total number of audios that were tagged earlier (either manually or by a machine). Let $F_1$ through $F_m$ denote the feature sets of the m completed audio files.

---

Algorithm Listing 1

---

1. Compute $F_{D_i}$
2. λ= 0.5 #Set the similarity threshold score to 0.5
3. $D_{sim} = \emptyset$ #Initialize the set of similar documents to the empty set
4. $P_{D_i} = \emptyset$
5. For j ← 1 to m; do
6.     Compute $\vec{S}_{D_j}$
7.     Compute $\vec{S}_{D_i}$
8.     If $\sigma(\vec{S}_{D_i}, \vec{S}_{D_j}) \geq \lambda$ then
9.         $D_{sim} = D_{sim} \cup \{D_j\}$
10. Foreach $D \in D_{sim}$; do
11.     Compute $F = F_{D_i} \cap F_D$
12.     Compute $P = \{(a, b) \mid (a, b) \in P_D \wedge a \in F\}$
13.     Foreach (a, b) ∈ P; do
14.         Compute $\psi_p(a, b) = \psi_{PD}(a, b) \times (\vec{S}_{D_i}, \vec{S}_D)$
15.         If (a, b) ∈ $P_{D_i}$ then
16.             If $\psi_{PD_i}(a, b) < \psi_p(a, b)$ then
17.                 $\psi_{PD_i}(a, b) = \psi_p(a, b)$
18.         Else
19.             $P_{D_i} = P_{D_i} \cup \{(a, b)\}$
20.             $\psi_{PD_i}(a, b) = \psi_p(a, b)$
21. Foreach a ∈ $F_{D_i}$; do
22.     I=imageLookup(a)
23.     Foreach b ∈ I; do
24.         If (a, b) ∉ $P_{D_i}$ then
25.             $P_{D_i} = P_{D_i} \cup \{(a,b)\}$
26.             $\psi_{PD_i}(a, b) = $ userRating(a, b)
27. return $P_{D_i}, \psi_{PD_i}(a, b) \forall (a, b) \in P_{D_i}$

---

Algorithm Listing 1 above indicates computing Feature set $F_{D_i}$ of the input document $D_i$ as a first step. Initializations take place in lines 2-4, by setting a similarity threshold λ value, an empty set to hold similar documents $D_{sim}$, and an empty set to hold the pairs of important terms and relevant images $P_{D_i}$. As indicated above, the threshold value is set to λ=0.5. In other embodiments, the threshold value may be configurable to be set to any number between 0 and 1. The higher the threshold value is configured to be, the higher the standard of similarity applied.

For every existing document within the set of document $D_1$-$D_m$, the score vectors ($\vec{S}_{D_i}$ and $\vec{S}_{D_j}$) are for the input document $D_i$ and the current document $D_j$. In some embodiment, the scores included in each of the score vectors may be the product of a weight function ω, which may be applied to each term in a given feature set of a document.

Weight Function ω

For each term $t \in F \subseteq D$ let $\omega(t, D) \in \mathbb{R}^+$ and $0 \leq \omega(t, D) \leq 1$ denote the weight function that assigns some appropriate weight to the term t:

$$\omega(t,D) \in \mathbb{R}^+ \quad (1)$$

where $0 \leq \omega(t, D) \leq 1$

Note that weight ω is a function of the document in which the term t appears. It is important to note also that it need not necessarily hold in the future that same terms appearing in two different documents get the same score. In other words, given two documents $D_a$ and $D_b$ and a term $t \in D_a \cap D_b$, it need not necessarily hold that $\omega(t, D_a) = \omega(t, D_b)$. The weight value given to each term t may be system configured or a manually entry by a user of the system.

The score vector calculation depends on the intersection of terms from the input $D_i$ and the current $D_j$. Hence, the score vector $\vec{S}_{D_j}$ has to be calculated for every comparison of input $D_i$ and current document $D_j$. In the step of line 8, the cosine similarity a is calculated.

Similarity Function σ

The cosine similarity function may be expressed in terms of dot product of two vectors and their magnitude. Cosine similarity is the measure of similarity between two vectors. Two vectors with the same orientation have a cosine similarity of 1. Conversely if they are orthogonal (perpendicular to each other) then the similarity is 0. Therefore, given two sets of important terms $F_a \subseteq D_a$ and $F_b \subseteq D_b$, the similarity function computes the similarity between the two set of features. To compute the cosine similarity value, consider the following terms:

Let $F_c = F_a \cap F_b$.

Let $\vec{S}_a$ and $\underline{S}_b$ be two sequences (score vectors) defined as follows.

$$\underline{S}_a = \langle \omega(t,D_a) | t \in F_c \rangle \text{ and } \underline{S}_b = \langle \omega(t,D_b) | t \in F_c \rangle$$

The similarity function $\sigma(\vec{S}_a, \vec{S}_b)$ is then defined as follows:

$$\sigma(\vec{S}_a, \vec{S}_b) = \frac{\vec{S}_a \cdot \vec{S}_b}{\|\vec{S}_a\| \|\vec{S}_b\|} \quad (2)$$

As indicated in line 8 of Algorithm Listing 1, the similarity score σ is compared with the threshold value λ (which is set to 0.5 in this example). If the similarity score exceeds the threshold value, the existing document $D_j$ is added in the set of similar documents $D_{sim}$, as indicated in line 9. At the end of this process, a set of documents $D_{sim}$ that are similar to the input document $D_i$ is created.

On line 11, the Algorithm proceeds to create a set of term-image pairs. This is accomplished by finding the common terms in the input document $D_i$ and a similar document D of $D_{sim}$, which is currently under consideration, as shown in line 12.

Term-Image Scores ψ

Every existing document $D_1$ through $D_m$ has a term-image score. It is formally defined as follows. Let $F_D = \{t_1, t_2, \ldots, t_k\}$ be the set of all terms tagged in document D, and let $I_D = \{i_1, i_2, \ldots, i_l\}$ for $0 < k \leq l$ be the set of images against which the terms in $F_D$ were tagged in document D. Let the set of term-image pairs be defined as follows:

$$P_D = \{(a,b) | a \in F_D \wedge b \in I_D \wedge \text{ pair } (a,b) \text{ is tagged in document } D\} \quad (3)$$

Then for each pair (a, b)∈P and ψ(a, b)=1. More generally ψ(a, b) ∈ ℝ and 0≤ψ(a, b)≤1

Thereafter, all such term-image pairs are extracted, for which each term appears in the input document $D_i$, and including the term-image pairs in set P, as indicated in line 12 of Algorithm Listing 1.

Now for every term-image pair in the set P, the term-image score $\psi_p$ (a, b) may be calculated, as shown in line 14. Then term-image score may be calculated by multiplying the term-image score $\psi_{P_D}$ (a, b) from the original document with the similarity score between that document and the input document $\sigma(\vec{S}_{D_i}, \vec{S}_D)$. For the term image pairs that appear in multiple documents, the highest score associated with that term-image pair may be assigned in some embodiments, as shown in lines 15-17. Otherwise, the term-image pair (a, b) is added to set P, and term-image score $\psi_p$ (a, b) is set in the term-image scores set $$\psi_{P_{D_i}}(a, b),$$

as shown in lines 18-20.

The method so far has identified term-image pairs for those terms that are common between the similar documents and the input document. But there could be some terms in the input document that are not common with any similar document. For such terms, corresponding images in the image library (with input as the term under consideration) may be located as shown in line 22. Thereafter, the located images are compared to those in the set of term-image pairs $P_{D_i}$ to ensure they were not already included, as shown in lines 23-26. The located images may then be presented to the user, and the user may be prompted to enter a rating value for each image, to get a rating regarding the relevance of each of the found image in relation to the corresponding term under consideration. The user's rating may be converted to a score between 0 and 1, and the given term-image pair may be included in the pair set $$\psi_{P_{D_i}}(a, b),$$

as shown in lines 25 and 26. Finally, the output of the method is the set of pairs of important terms and relevant images $P_{D_i}$, and the score of each such pair as denoted by $$\psi_{P_{D_i}}(a, b) \forall (a, b) \in P_{D_i}.$$

Figure 4:
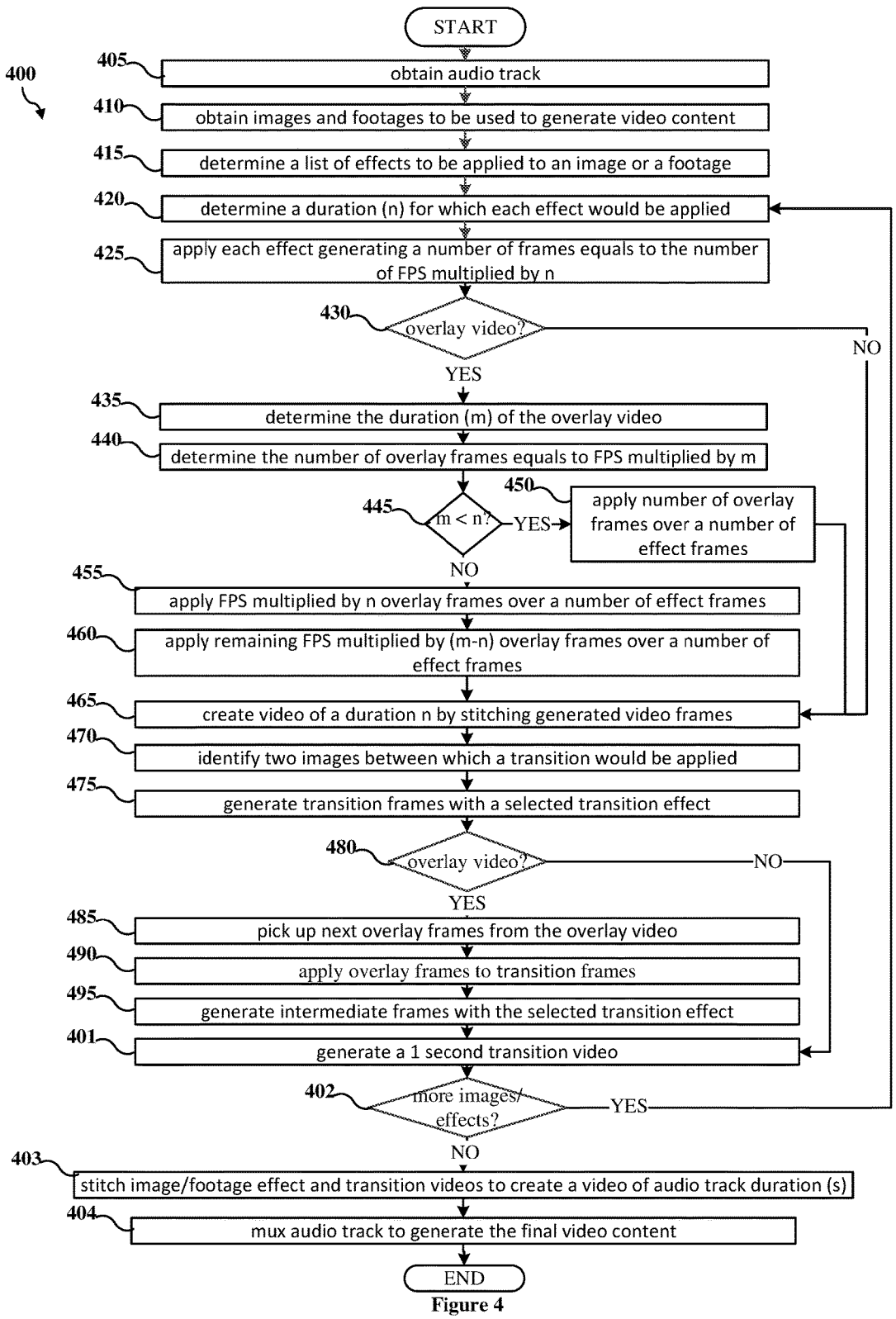
FIG. 4 illustrates a method of operation of a video composition engine according to one preferred embodiment of this invention.

FIG. 4 illustrates a method of operation of a video composition engine 400 according to one preferred embodiment of this invention. In a preferred embodiment, a video may have a defined list of images. Each image may also have a defined display time and effect to be applied while stitching the given image into the video. The length of that particular effect may be equal to the display time of that image. Images may be separated by different transitional visual effects. The overall video to be generated may be blended with another video (flare, lighting, etc.). The whole process may be driven by a configuration means, which may be ingested as a user input. This configuration means may define the order of images, effects, transition, their timing parameters, etc. In some embodiments, the duration of a visual/special effect may be translated into a number of frames. In other embodiments, there may arise a need to generate intermediate frames for the purposes of transitioning from one video content component to the other, based on the transition duration. In yet other set of embodiments, a longer duration video may be generated by stitching together smaller image based videos with relevant transitional video(s) between them.

In some embodiments, the method of operation of the video composition engine 120 may include the step of obtaining and reading the subject audio track 405. In step 410, the system obtains multimedia assets (for example: images, footages, etc.) to be used in the process of generating the video content. In some embodiments, the method might include the step of determining the video effects, transitions, etc, to be configured and applied to the video content.

Transition refers to how one image blends into the next. Effects, such as zoom in/zoom out, are to be applied on top of a single image. All may be utilized in creating the video content, according to some preferred embodiments.

Step 420 of this method involves the determination of the duration n, for which each given video effect may be applied. In step 425 of this method, in some embodiments, for each image, intermediate frames may be created by way of applying a selected corresponding effect. For example, if the selected effect is a zoom-in effect, intermediate frames are created where a zoom-in of 50% to 100% of the image is displayed. The number of such frames is frames per second (FPS—configuration of the video) is multiplied by the duration for the image n. In some embodiments, the duration for each image n may be configurable by the user of the system. Thus to illustrate, if the user has configured to show Image1 for 10 seconds and the FPS value is 30 then 300 frames may be generated, where each image is incrementally zoomed-in.

In step 430, an optional determination is made as to whether an overlay video, such as a flare moving from top-left corner of the screen to the top-right corner, needs to be added. In this case, blending the original frames and the frames extracted from the overlay video forms intermediate frames. If a video needs to be overlaid on top, then step 435 of the method involves the determination of the duration m of the overlay video.

In some embodiments, the method may include a step 440 involving the calculation and extract of the number of overlay video frames equals to multiplying number of frames per second (FPS) by the duration of the overlay video m. If the duration of the overlay video m is less in value than the video effect duration n 445, a step involving superimposing the number of overlay video frames extracted in step 450 on top of the same number of image effect frames may be included.

If the duration of the overlay video m is bigger in value than the video effect duration n, then step 455 involving superimposing the number of overlay video frames, equals to FPS multiplied by n on top of the same number of image effect frames may be included. Additionally, step 460 involving superimposing the rest of the overlay frames (FPS multiplied by (m-n)) on top of the same numbers of image effect frames may also be included.

In some preferred embodiments, this method may include a step 465 of creating video content of duration n by stitching all the resultant frames. A step 470 is to identify two images (For example, image A and image B), between which the transition effect may be applied. The method may also include a step 475 to generate transition number of frames for transitioning from image A to image B with a selected transition effect.

In some embodiments, a step 480 may involve the determination of whether a video needs to be overlaid on top. If a video needs to be overlaid, the method may include a step 485 to pick up the next number of frames, as used in step 470, from the overlay video. Step 490, may involve the superimposition of the next number of overlay video frames on top of the transition effect frames. In some preferred embodiments, the method may also include a step 401 to generate the transition effect video, which may be of a duration of one second.

In step 402, a determination may be made as to whether more images, effects, etc are available. If there are more images, effects, etc are available, steps may be applied, starting with step 420, to generate rest of the image effect videos of length n each, and the transition effect videos of length one second.

If in step 402 a determination is made that no more images, effects, etc are available for processing, the method may include a step 403 to stitch image effect and transition effect videos in correct order to create the combined video content of the subject audio track. In some embodiments, a final step 404 may be included to multiplex the subject audio track with the video content of step 403 to generate the final video output.

Accordingly, the first and last one second worth of frames are isolated, and video may be created using the remaining frames. When creating the next video, the last one second worth of frames may be blended with the first one second of frames (# of frames=FPS) to create the transition effect. In some embodiments, the user may select transition effect of choice, such as "oil paint", "pixelise" etc. Accordingly, the video may be formed using these blended frames.

Thus, for every image (except the first one), there may be two corresponding videos: the first containing the video/visual effect, and the second including the transitional content. In some embodiment, all these videos may then be stitched to create a video content with a greater duration. If the audio duration is greater than the produced video content duration, a technique of loop back to process another image may be applied, in some preferred embodiments. Finally, the audio track and the video content produced may be combined, thus producing the final video.

The following software program code represents one example implementation of the method of operation of the video composition engine 120, according to one preferred embodiment as provided by the current invention:

Code Listing 1

```
1. Download Assets( )
2. audioDuration = getAudioDuration( )
3. totalDuration = 0
4. Create Config( )
5. GetFlare( )
6. if (flare( )){
7.    flareFrames[ ] = extractFramesFromFlarevideo( )
8. }
9. while (line = readconfigline( ) && totalDuration < audioDuration) {
10.    if (lineisEffectConfig( )) {
11.        params = readParams( )
12.        if (paramscontainImageAsset( )) {
13.            Image = readImage(params)
14.            effectConfig = readEffectConfig(params)
15.            duration = readDuration(params) − 2
```

Code Listing 1
```
16.            If (EffectIsTimeVarying( )) {
17.                frames[ ] = applyEffect(Image, duration)
18.                //will generate frames as per 30fps with applied effect
19.            } else if (EffectisStatic( )) {
21.                iImage = applyEffect(Image)
22.            } else {
23.                iImage = Image
24.            }
25.            if (Flare( )) {
26.                if (EffectIsTimeVarying( ))
27.                    oFrames[ ]=composite(frames, flareFrames)
28.                else
29.                    oFrames[ ]=composite(iImage, flareFrames, duration)
30.                video = generateVideo(oFrames)
31.            }else{
32.                if(EffectIsTimeVarying( ))
33.                    video = generateVideo(frames)
34.                else
35.                    video = generateVideo(iImage)
36.            }
37.        } else {
38.            iVideo = readVideo(params)
39.            duration = readDuration(params)
40.            ivideo = clipDuration(iVideo, duration)
41.            if (Flare( )) {
42.                vFrames[ ] = extractFrames(video)
43.                oFrames[ ] = composite(vFrames, flareFrames)
44.                video = generateVideo(oFrames)
45.            } else {
46.                video = ivideo
47.            }
48.            totalDuration += duration
49.        }
50.        videoList = addtoList(video)
51.        if (trans) {
52.            lFrames = ExtractLast1Sec(lastvideo)
53.            cFrames = ExtractFirst1Sec(video)
54.            tFrames = GenerateTransition(lFrames, cFrames, trans)
55.            tVideo = GenerateVideo(tFrames)
56.            videoList = addtoList(tVideo)
57.        }
58.        lasttvideo = video
59.    } else {
60.        trans = readTransition( )
61.        if(lastLine) {
62.            lFrames = ExtractLast1Sec(lastvideo)
63.            cFrames = ExtractFirst1Sec(firstvideo)
64.            tFrames = GenerateTransition(lFrames, cFrames, trans)
65.            tVideo = GenerateVideo(tFrames)
66.            videoList = addtoList(tVideo)
67.        }
68.    }
69. }
70. while (totalDuration < audioDuration) {
71.    curVideo = getVideo(videoList)
72.    videoList = addtoList(curVideo)
73.    totalDuration += curVideoDuration;
74. }
75. if (totalDuration > audioDuration) {
76.    lastVideo = takeLastVideo(videoList)
77.    diff = totalDuration − audioDuration
78.    lastVideo = clipduration(lastVideo, diff);
79.    videoList = addtoList(lastVideo)
80. }
81. fVideo= concatVideo(videoList);
82. VIDEO = muxAudio(audio, fVideo);
```

Figure 5:
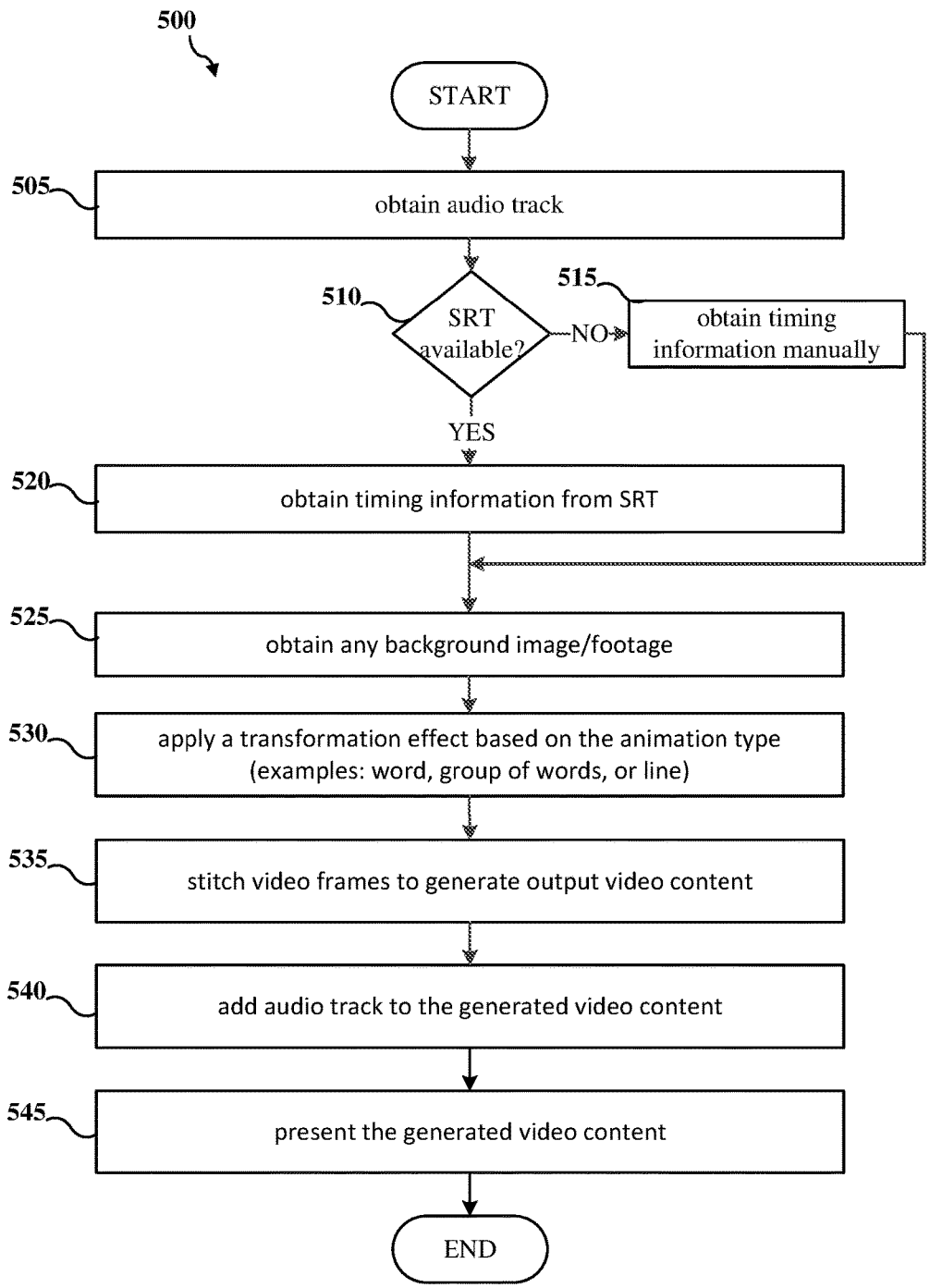
FIG. 5 shows a method of operation of a kinetic typography service according to one preferred embodiment of this invention.

FIG. 5 shows a method of operation of a kinetic typography service 500 according to one preferred embodiment of this invention. The method shown in FIG. 5 may include a step 505 where the kinetic typography service may obtain an audio track. The method may also include a step 510 where the kinetic typography service may obtain a corresponding Subtitle File (SRT) file. The kinetic typography service may divide the audio track into different regions, such that each region will have a corresponding SRT line including a start and end time stamps, as shown in step 520. If no such SRT line exits, the start and end time stamps may be determined via other means, such as manually locating and recording the start and end time stamps, as illustrated in step 515.

The kinetic typography service may group all words from each SRT line. The service may then define preset animations such as a zoom-in, fade-out, etc. Thereafter, the service may render canvas with a selected background image or footage, as shown in step 525. The service may then select a random animation from a group of animations, and may apply the selected animation to the group of words, as in step 530. In some embodiments, a creator user may be given the option to choose an animation from the group of animations to be applied to the group of words. The service may render the words in appropriate font, color, and orientation on the canvas. In some embodiments, the service may move the viewport over individual words so as to eliminate any overlap between any two words in the group. The service may also interpolate intermediate frames based on the selected animation, and may store intermediate frames, in other embodiments. The service may then generate video content by stitching individual video frames, as shown in step 535, and then may add audio track to the generated video content, as shown in step 540. Finally, as illustrated in step 545, the kinetic typography service may present the final generated video to the user.

The kinetic typography service may be a software based tool that runs on a computer hardware, which may accept input to be used in generating a video content. In some embodiments, the kinetic typography service may be a software module running within the backend service 105. In other embodiments, the kinetic typography service may run within the video composition engine 120.

In some embodiments, the input may include media assets, media subtitles, background image, video frames, etc. In some of these embodiments, the subtitles' text may be displayed coupled with visual effect(s) that may be placed on top of background images or footages. The kinetic typography service may provide fine level controls for the purposes of animating single words or a group of words that are included in the subtitles.

In some embodiments, the user may provide an audio asset along with its corresponding subtitles as input to the system. The corresponding subtitles may be included in an SRT as input to the system. The user may then preview the video, alters video elements settings if needed. The system may then auto generates a kinetic typography video with different text layouts and animations applied.

One preferred method by which the system may generate the kinetic typography video may involve an HTML5 compatible internet browser that may use HTML5 canvas element for rendering three dimension (3D) computer graphics and two dimension (2D) graphics elements like text, images, etc. The user may be using a computer running an internet browser. The user may provide required inputs, such as an audio file, subtitle file, text styling parameters, etc, and the video will be rendered on the computer. The produced video may be captured using a screen recording tool or a browser specific plug-in application.

Another preferred method by which the system may generate the kinetic typography video on a machine that is hosting an HTTP/HTTPS based web application on headless server or server clusters. The user may connect using any HTML5 compatible browser. Through the browser, the user may provide required inputs like audio file, subtitle file, text styling parameters etc. The user may then send the HTTP request to a web server for rendering the video.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method for generating video content based on an audio media asset, comprising the steps of:
   providing access to a computer memory configured to store a plurality of media assets;
   providing access to a network, wherein the computer memory is connected to the network;
   identifying at least one image and at least one video effect;
   determining an effect time duration to apply the video effect;
   applying the video effect to the image;
   generating a first video frame using the applied video effect to the image;
   generating a plurality of effect video frames based on the first video frame, wherein the first video frame and the effect video frames have an effect video frames number;
   arranging the first video frame and the plurality of effect video frames to form a video media asset;
   combining the audio media asset with the video track to produce a final video content;
   determining whether the effect video frames are overlaid;
   in response to determining the effect video frames are overlaid, determining an overlay time duration;
   extracting a plurality of overlay video frames from the overlay video frames, wherein the plurality of overlay video frames have an overlay video frames number;
   determining whether the overlay video frames number is less than the effect video frames number;
   in response to determining the overlay video frames number is less than the effect video frames number, superimposing the overlay video frames over the effect video frames;
   in response to determining the overlay video frames number is not less than the effect video frames number, superimposing the effect video frames number of the overlay video frames over the effect video frames; and
   superimposing the overlay video frames number minus the effect video frames number of the overlay video frames over the effect video frames.

2. The method of claim 1, wherein the effect video frames number is equals to a Frames Per Second (FPS) of the video media asset multiplied by the effect time duration.

3. The method of claim 2, wherein the overlay video frames number is equals to an FPS of the overlay video frames multiplied by the overlay time duration.

4. The method of claim 1, further comprising the steps of:
identifying a second image;
selecting a transition effect to be applied between the image and the second image;
applying the transition effect to a transition effect video frame; and
generating a transition effect video frame for transitioning from the image to the second image based on the transition effect video frame.

5. The method of claim 4, further comprising the steps of:
determining whether the transition effect video frame is overlaid;
in response to determining the transition effect video frame is overlaid, superimposing one overlay video frame on top of the transition effect video frame; and
including the transition effect video frame in the corresponding order to be combined with the video content.

6. The method of claim 5, wherein the first video frame and the effect video frames have an effect video frames number.

7. The method of claim 6, further comprising the steps of:
determining whether the effect video frames are overlaid;
in response to determining the effect video frames are overlaid, determining an overlay time duration;
extracting a plurality of overlay video frames from the overlay video frames, wherein the plurality of overlay video frames have an overlay video frames number;
determining whether the overlay video frames number is less than the effect video frames number;
in response to determining the overlay video frames number is less than the effect video frames number, superimposing the overlay video frames over the effect video frames;
in response to determining the overlay video frames number is not less than the effect video frames number, superimposing the effect video frames number of the overlay video frames over the effect video frames; and
superimposing the overlay video frames number minus the effect video frames number of the overlay video frames over the effect video frames.

8. The method of claim 7, wherein the effect video frames number is equals to 21 Frames Per Second (FPS) of the video media asset multiplied by the effect time duration.

9. The method of claim 8, wherein the overlay video frames number is equals to an FPS of the overlay video frames multiplied by the overlay time duration.

10. The method of claim 9, wherein least the audio media asset is stored in a second computer memory.

11. The method of claim 10, wherein the second computer memory is accessible over the network.

12. The method of claim 10, wherein the second computer memory is accessible over an external network.

13. The method of claim 9, wherein the audio media asset is stored in an external computer memory.

* * * * *